United States Patent [19]

Levy

[11] Patent Number: 5,168,268
[45] Date of Patent: Dec. 1, 1992

[54] OPTICALLY TRANSMISSIVE ARMATURE FOR CURSOR CONTROL DEVICE

[75] Inventor: David Levy, Santa Clara, Calif.

[73] Assignee: Apple Computer, Inc., Cupertino, Calif.

[21] Appl. No.: 710,608

[22] Filed: Jun. 5, 1991

[51] Int. Cl.[5] ............................................. G09G 3/02
[52] U.S. Cl. ................................. 340/709; 340/710; 250/231.14
[58] Field of Search ................ 250/231.14, 231.16, 250/227.11, 237.6, 221, 239; 340/709, 710

[56] References Cited

U.S. PATENT DOCUMENTS

| | | | |
|---|---|---|---|
| 4,607,159 | 8/1986 | Goodson et al. | 74/471 X Y |
| 4,731,530 | 3/1988 | Mikan | 340/709 |
| 4,935,621 | 6/1990 | Pikulski | 250/221 |
| 4,935,728 | 6/1990 | Kley | 340/709 |
| 4,951,034 | 8/1990 | Mazzone et al. | 74/471 X Y |

Primary Examiner—Jeffery A. Brier
Assistant Examiner—A. Au
Attorney, Agent, or Firm—Stuart J. Madsen

[57] ABSTRACT

An optically transmissive armature is presented for use with an optical encoder mechanism in a cursor control device. The armature includes a substantially planar rectangular base, a plurality of supports, and a plurality of optical wave guides. An encoder mechanism is rotatably secured to the supports by an axis and is disposed in a predetermined position between the wave guides. The guides provide an optical pathway between photo-emitter/photo-detector pairs mounted on the surface of the printed circuit board of the cursor control device.

13 Claims, 2 Drawing Sheets

OPTICALLY TRANSMISSIVE ARMATURE FOR CURSOR CONTROL DEVICE

BACKGROUND OF THE INVENTION

1. Field of the Invention

The present invention relates generally to control devices for interfacing with and manipulating the position of graphical objects generated on a computer display, and more specifically to an optically transmissive armature for providing an improved optical pathway for light signals representative of the movement of a cursor control device.

2. Brief History

A standard component of today's computer controlled display systems is a cursor control device, external from an ordinary keyboard, commonly referred to as a "mouse." A typical mouse is a hand-held device which allows a user to control the position of a cursor on an associated display by simple translational movement of the mouse body and associated roller-ball over a frictional surface.

State of the art cursor control devices usually operate by manipulating beams of light within the device body in a manner such that the affected light signals are representative of the translational movement of the device across a surface. An example of this type of cursor control device is presented in U.S. Pat. No. 4,464,652, which is hereby incorporated by reference. The device as described therein uses encoder wheels, each of which includes a roller shaft frictionally coupled to the roller-ball of the device. In one common configuration, two encoder wheels are utilized and include associated roller shafts positioned at substantially 90 degrees relative to one another. When the roller-ball is rolled over a surface, depending on the direction of motion of the ball, the roller shafts will rotate and spin the attached encoder wheels. If the ball is rolled exclusively in a first translational direction, for example, along an imaginary x-axis, only a single roller shaft and associated wheel will rotate. If the ball is rolled exclusively in a direction perpendicular to the first direction, for example, along an imaginary y-axis, the other roller shaft and associated wheel will rotate. Movement of the ball in a combination of these x and y directions will cause both shafts and associated wheels to rotate.

The encoder wheels each have a plurality of radially disposed slots towards their outer peripheries. Light beams, produced by photo-emitters, intermittently pass through the slots as the encoder wheel rotates and are received by carefully aligned photo-detectors. Each wheel is positioned between two pairs of photo-emitters and photo-detectors and assiduously arranged such that, when the light beam from a first photo-emitter is fully transmitted through one of the slots, the other beam from the second photo-emitter is partially blocked by the body of the wheel. Beam interruptions produce signal pulses representing increments of motion, while the order in which the light beams are interrupted indicates the direction of motion. These signal pulses are translated into computer code and direct the cursor on the computer display to track the movement of the cursor control device.

A significant problem with this type of device is that the optical and mechanical components require extremely precise alignment. Indeed, the single largest reason for functional rejects in the manufacture of cursor control devices, i.e., mice and trackballs, is insufficient alignment of the optics. And, not only do the photo-emitters and photo-detectors require precise relative alignment, but the encoder wheels must also be precisely aligned relative to each of the photo-electrical components in order to assure proper device performance.

An additional drawback with this type of device is that it cannot be reliably manufactured robotically without custom automation. Because the optical encoding assemblies must face each other, they cannot be surface mounted, and pick-and-place machines cannot be used. A custom robot is required for each assembly, or, alternatively, an additional subassembly must be created which requires a separate automatic manipulator to provide for full automation. This significantly increases production costs and time, and decreases associated product reliability.

SUMMARY OF THE INVENTION

In the preferred embodiment of the present invention, a novel support armature is provided for use in a cursor control device which obviates the alignment and manufacturing problems associated with prior art devices. The armature functions as a wave guide for signals transmitted between surface mounted photo-emitters and photo-detectors, and as a structural support for various encoder components. The armature is made from an optically transmissive type of material, usually transparent or translucent plastic, and is secured directly over the surface-mounted photo-electrical components on the printed circuit board (PCB) of the device. Light transmitted by a surface-mounted photo-emitter is directed through a portion of the armature along a predetermined path, through the encoder wheel, and to a surface mounted photo-detector. The signals detected by the photo-detector are then translated into code, as is well known in the art, representative of the device's movement. Additionally, the encoder mechanism of the device is secured directly to the armature in a predetermined position which ensures accurate alignment between the optically interactive components of the device.

A significant advantage in using an armature as described above is that the prior art device need for face-to-face implementation of the necessary photo-electronics is obviated, thus enabling the photo-emitters and photo-detectors to be robotically surface-mounted directly onto the PCB. Additionally, because the encoder components are attached to or integral with the armature, the alignment problems associated with prior art devices is eliminated, and product reliability is greatly enhanced.

IN THE DRAWING

DETAILED DESCRIPTION OF THE PREFERRED EMBODIMENTS

Figure 1:
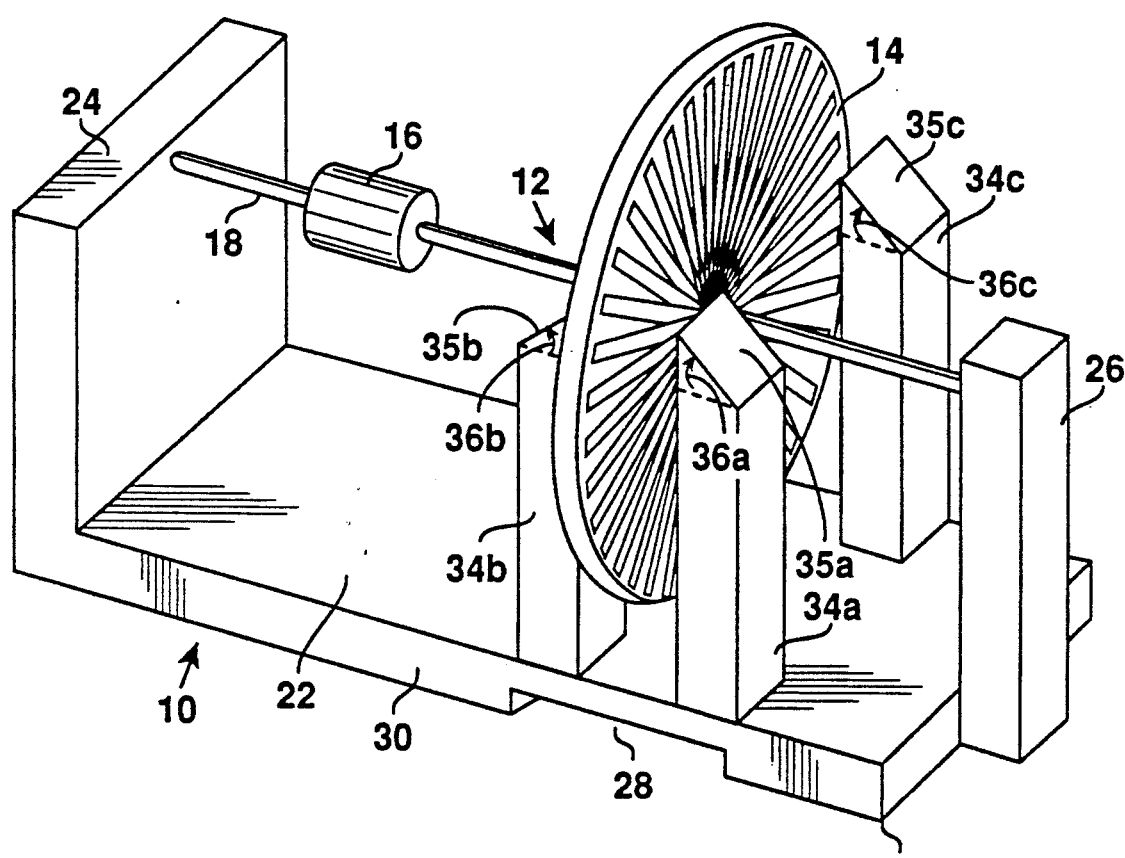
FIG. 1 is a perspective view of the preferred embodiment of the present invention illustrating an armature and associated encoder mechanism.

Referring now to FIG. 1, shown is a perspective view of an optically transmissive armature 10 in accordance with the present invention. Armature 10 includes a base 20 having a substantially planar upper surface 22. A first support 24 is orthogonally disposed at a first end of base 20, and a second support 26 is orthogonally disposed at a second end of base 20, opposite the first end. A transverse rectangular groove 28 is formed at a predetermined position in the bottom surface of base 20, and extends from a first side 30 of the base to a second opposite side 32 (not shown). Four separate optical wave guides 34a–34d are symmetrically disposed on upper surface 22 of base 20, and over groove 28, in orthogonal relationship to the base. Wave guides 34a–34d are similarly shaped relative to one another, and each extends upward an equal predetermined distance from base 20.

In the preferred embodiment, the wave guides have substantially rectangular cross-sections with the distal end of each of the guides being beveled. Planar surfaces 35a–35d defined by the beveled ends of guides 34a–34d, respectively, form predetermined angles 36a–36d, respectively, in relation to upper surface 22 of the base. Angles 36a–36d can be of any degree sufficient to maintain the proper guiding function of the wave guide, as described below. In the preferred embodiment, the angles are the same for each of the beveled surfaces of the guides, and are approximately 45 degrees with respect to planar upper surface 22. A first pair of the guides, 34a and 34b, are disposed on side 30 of base 20, over groove 28, in face to face relationship, and are oriented such that their distal beveled surfaces 35a and 35b, respectively, are oppositely directed relative to one another. Similarly, a second pair of guides, 34c and 34d, are disposed on side 32 of base 20, over groove 28, in face to face relationship, and are oriented such that their distal beveled surfaces 35c and 35d, respectively, are oppositely directed relative to one another.

Armature 10 is normally formed from a sturdy transparent or translucent material, such as a clear plastic, which enables it to function as both a support for an optical encoder mechanism 12, and as a wave guide for photo-electrical signals emitted by various surface mounted photo-electronics, as further described below. It is contemplated that armature 10 can be formed as a single integrated unit, or that it can be formed from a plurality of component parts. For example, it is entirely possible that base 20, supports 24 and 26, and wave guides 34a–34d could be integrally molded into a single uniform structure. If this method is used, the entire structure would normally be formed from a single material type.

Alternatively, it is contemplated that the various components of the armature could be separately formed and integrated into a single unit at a later time in the manufacturing process. In this instance, it would be possible to form the various component parts from different relative material types. That is, for example, supports 24 and 26 could be formed from any suitable material which enabled them to provide the requisite support to the encoder mechanism, while the base and wave guides could be formed from any suitable material exhibiting the requisite light transmitting characteristics of the armature. The important feature to be preserved is the optical transmissiveness of the light guides and the portion of the base which is disposed over the photo-electronics. Any combination of materials and manufacture which preserve this characteristic of the armature would be appropriate. In the preferred embodiment, the entire armature 10 is integrally formed as a single structural unit by a process such as injection molding or the like.

Encoder mechanism 12 is structurally associated with armature 10, and includes an encoder wheel 14, a frictional contact roller 16 and an axial support shaft 18. Support shaft 18 is fixedly secured through the center of roller 16, and is further fixedly secured through the center of encoder wheel 14. A first end of shaft 18 is rotatably coupled to support 24, and a second end of shaft 18 is rotatably coupled to support 26. As will be described in further detail below, this configuration provides and important feature of the present invention in that the encoder wheel assembly is secured directly to the support structure of the armature, thus providing a single armature/encoder assembly.

With shaft 18 secured to supports 24 and 26 in this manner, encoder wheel 14 is positioned such that a first of its planar surfaces faces guides 34a and 34c, and a second of its planar surfaces faces guides 34b and 34d. As can be seen with reference to FIG. 1, each of the beveled surfaces 35a–35d of the guides face away from wheel 14 and are disposed toward the outer periphery of the wheel. In the preferred embodiment, the center of the each beveled surface is disposed at substantially the same height as axis 18, and a single slot of the wheel allows light to pass between the wave guide pairs. Wheel 14 is suspended over base 20 and is able to rotate freely with respect to armature 10 when shaft 18 is rotated by contact roller 16 as the cursor control device is moved. That is, the spherical roller-ball (not shown) of the cursor control device contacts roller 16 and causes the entire encoder mechanism 18 to rotate proportionally in relation to the device's translational movement.

Figure 2:
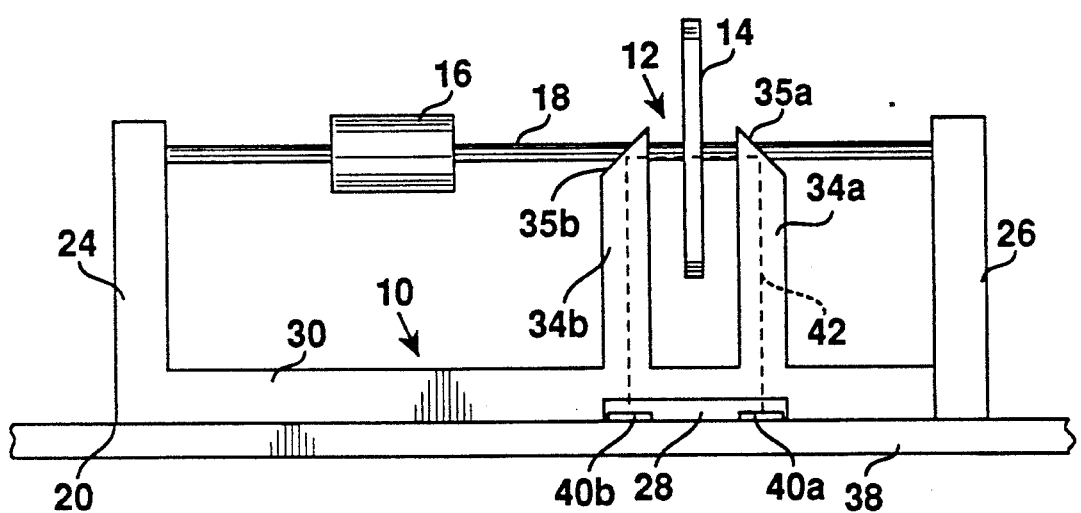
FIG. 2 is an elevational view of an armature in accordance with the preferred embodiment illustrating its interrelationship with a printed circuit board and associated photo-electronics of a cursor control device.

Referring now to FIG. 2, shown in an elevational view of armature 10, illustrating its interrelationship with a printed circuit board 38 and associated surface mounted photo-electronics of a cursor control device. Photo-emitters 40a and 40c (not shown), and photo-detectors 40b and 40d (not shown) are mounted on the surface of PCB 38, which is internal to the cursor control device. Armature 10, with encoder mechanism 12 attached, is secured to PCB 38 and positioned such that photo-emitter 40a and photo-detector 40b are entirely disposed within groove 28, directly below wave guides 34a and 34b, respectively. Similarly, photo-emitter 40c and photo-detector 40d are disposed entirely within groove 28, directly below guides 34c and 34d, respectively. Armature 10 can be secured to the PCB in any appropriate manner which ensures that the relative positions of the wave guides and the surface mounted photo-electronics remain fixed. In the preferred embodiment, the armature is secured to the PCB by an adhesive. Alternatively, the cursor control device could be modified to provide a complimentary surface configuration to armature 10 in a manner which enables the armature to be securely snapped into place over the photo-electronics. This arrangement would ensure that the armature is positioned correctly, and would further increase the efficiency of automated production.

As described above, in its operational configuration, armature 10, with assembly 12, is secured to PCB 38 over photo-electronics 40a–40d. As will be understood by one skilled in the art, a single armature/encoder assembly is normally used to convey a single translational direction of motion of the cursor control device. This is similar to the prior art method of using two photo-detector/photo-emitter pairs straddling a single encoder wheel to convey single axis motion information. In the preferred embodiment, two armature/encoder assemblies are normally employed to fully track two dimensional motion of a device. For example, a first armature/encoder assembly is used to track device motion in the x-direction, and a second armature/encoder assembly is used to track device motion in the y-direction. These assemblies are normally disposed in the device such that the axial support shaft 18 of each of the assemblies are in mutually orthogonal relationship to one another, and the spherical roller-ball of the device makes contact with the roller 16 of each assembly. When the device is moved and the ball rolls, the first assembly is operative to encode device movement in the x-direction, and the second assembly is operative to encode device movement in the y-direction. Of course, alternative configurations could be utilized to achieve the same results, and the usefulness of the invention extends easily to motion not limited to two dimensions.

In operation, as shown in FIG. 2, photo-emitter 40a emits a photo-electrical signal, or light beam, 42 which is directed upward from PCB 38. Light beam 42 travels through wave guide 34a and is reflected by the guide's beveled surface 35a in a direction toward wave guide 34b. When encoder wheel 14 is in a transmitting position, that is, when one of the slots of the wheel aligns to allow light to pass through, light beam 42 travels through the wheel and is reflected downward at beveled surface 35b of wave guide 34b toward photo-detector 40b. Photo-detector 40b receives the light beam, and transmits the appropriate positional information to the logic circuitry of the device. Similarly, photo-emitter 40c emits a light beam 44 (not shown) which is directed upward from PCB 38. Light beam 44 travels through wave guide 34c and is reflected by the guide's beveled surface 35c in a direction toward wave guide 34d. When encoder wheel 14 is in a transmitting position, light beam 44 travels through the wheel and is reflected downward at beveled surface 35d of wave guide 34d toward photo-detector 40d. Photo-detector 40d receives the light beam, and transmits the appropriate positional information to the logic circuitry of the device. In the preferred embodiment, the beveled surfaces 35a–35d of wave guides 34a–34d are treated with a reflective coating, such as aluminum, to enhance reflectiveness of the surface and increase signal responsiveness.

A significant advantage of the present invention is that photo-emitters 40a and 40c, and photo-detectors 40b and 40d can be surface mounted photo-electronic devices, and thus secured to the PCB by a completely automated process. This drastically cuts production costs and increases overall device effectiveness and reliability. Additionally, because encoder mechanism 12 and armature 10 are integrated into a single assembly, the relative alignment between the wave guides and the wheel is fixed. This drastically reduces the optical alignment problems inherent in the prior art devices. Thus, the only alignment necessary in accordance with the present invention is between armature 10 and the photo-electronics on PCB 38. Because of the transmissive characteristics of the wave guides, this alignment can be easily achieved by presently known automated production techniques, and can be further ensured by appropriate modification of the cursor control device, as described above.

What is claimed is:

1. An integrated armature/encoder assembly for a cursor control device which utilizes photo-electronics to provide photo-electrical signals for encoding information representative of the translational motion of the device, comprising:

a base member, at least a portion of which is optically transmissive;

a plurality of optical wave guides disposed at predetermined positions on said base member and over said optically transmissive portion for guiding the photo-electrical signals along predetermined pathways between the photo-electronics of the control device; and, optical encoding means, rotatably secured to said base member and disposed between at least two of said wave guides, for selectively transmitting the photo-electrical signals between the photo-electronics.

2. An assembly as described in claim 1 wherein said plurality of wave guides includes at least four guides, a first pair of which are in optical communication with one another and are positioned to carry photo-electrical signals between a first photo-emitter of said device and a first photo-detector of said device, and a second pair of which are in optical communication with one another and are positioned to carry light signals between a second photo-emitter of said device and a second photo-detector of said device.

3. An assembly as described in claim 2 wherein said encoding means includes an encoding wheel disposed between a first and second guide of said first pair of guides, and a third and fourth guide of said second pair of guides.

4. An assembly as described in claim 3 wherein said base member includes:

a first support disposed at a first end of said member; and, a second support disposed at a second end of said member, opposite said first end.

5. An assembly as described in claim 4 wherein said encoding wheel is axially coupled between said first support and said second support.

6. An assembly as described in claim 5 wherein said four guides each have a beveled distal end, and further wherein said beveled distal ends of said first pair of guides are oppositely directed relative to one another, and said beveled distal ends of said second pair of guides are oppositely directed relative to one another.

7. An assembly as described in claim 7 wherein said beveled ends include a reflective coating to better enhance the optical responsiveness of said guides.

8. An optically transmissive armature for use with an encoder mechanism in a cursor control device which utilizes light signals to represent device movement and position, comprising:

an optically transmissive base;

a plurality of optical wave guides, disposed at first predetermined positions on said base, for providing an optical pathway for the light signals; and, a plurality of support members, disposed at second predetermined positions on said base, for rotatably securing the encoder mechanism to said base in a third predetermined position relative to said guides.

9. An armature as described in claim 8 wherein said plurality of optical wave guides includes a first and second wave guide, disposed in optically communicative relationship, for carrying signals from a first photo-emitter to a first photo-detector of the control device, and a third and fourth wave guide, disposed in optically communicative relationship, for carrying signals from a second photo-emitter to a second photo-detector.

10. An armature as described in claim 9 wherein the ends of said guides are beveled and are oriented such that light signals from said first photo-emitter are reflected by a first beveled surface of said first guide to a second beveled surface of said second guide, and then to said first photo-detector, and light signals from said second photo-emitter are reflected by a third beveled surface of said third guide to a fourth beveled surface of said fourth guide, and then to said second photo-detector.

11. An armature as described in claim 10 wherein a portion of the bottom surface of said base defines a groove which is capable of accommodating the first and second photo-transmitters and the first and second photo-receivers when said base is positioned thereover.

12. An armature as described in claim 11 wherein said wave guides are disposed over said groove.

13. An armature as described in claim 12 wherein said base, said guides and said supports are integrally formed from a translucent plastic material.

* * * * *